T. MYHRUM.
SOLDERING MACHINE.
APPLICATION FILED MAR. 1, 1920.
1,389,894.
Patented Sept. 6, 1921.
7 SHEETS—SHEET 6.
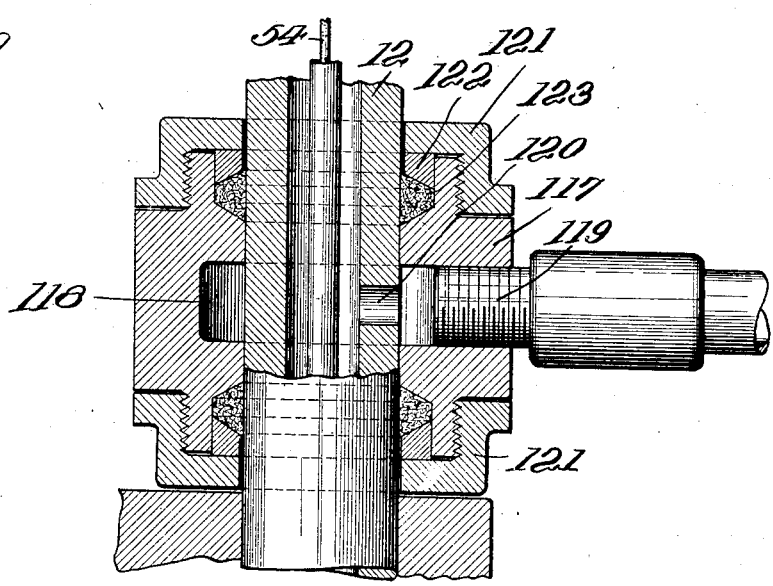
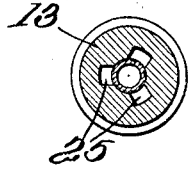
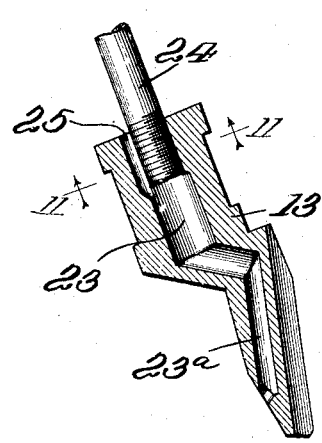
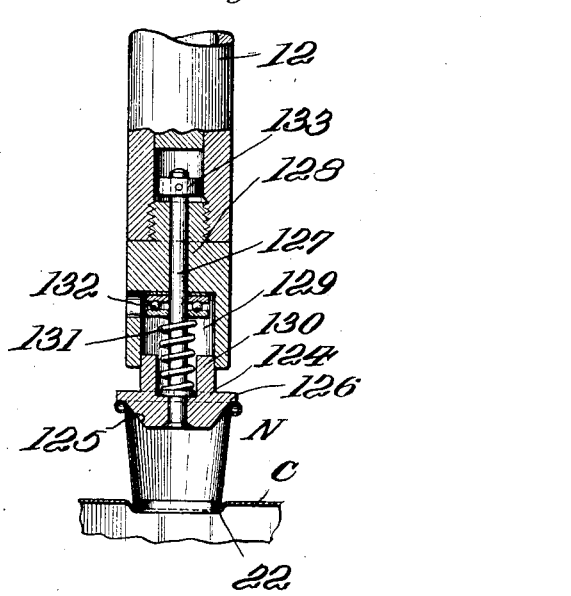
Inventor
Thomas Myhrum
By Sturtevant & Mason
Attys.

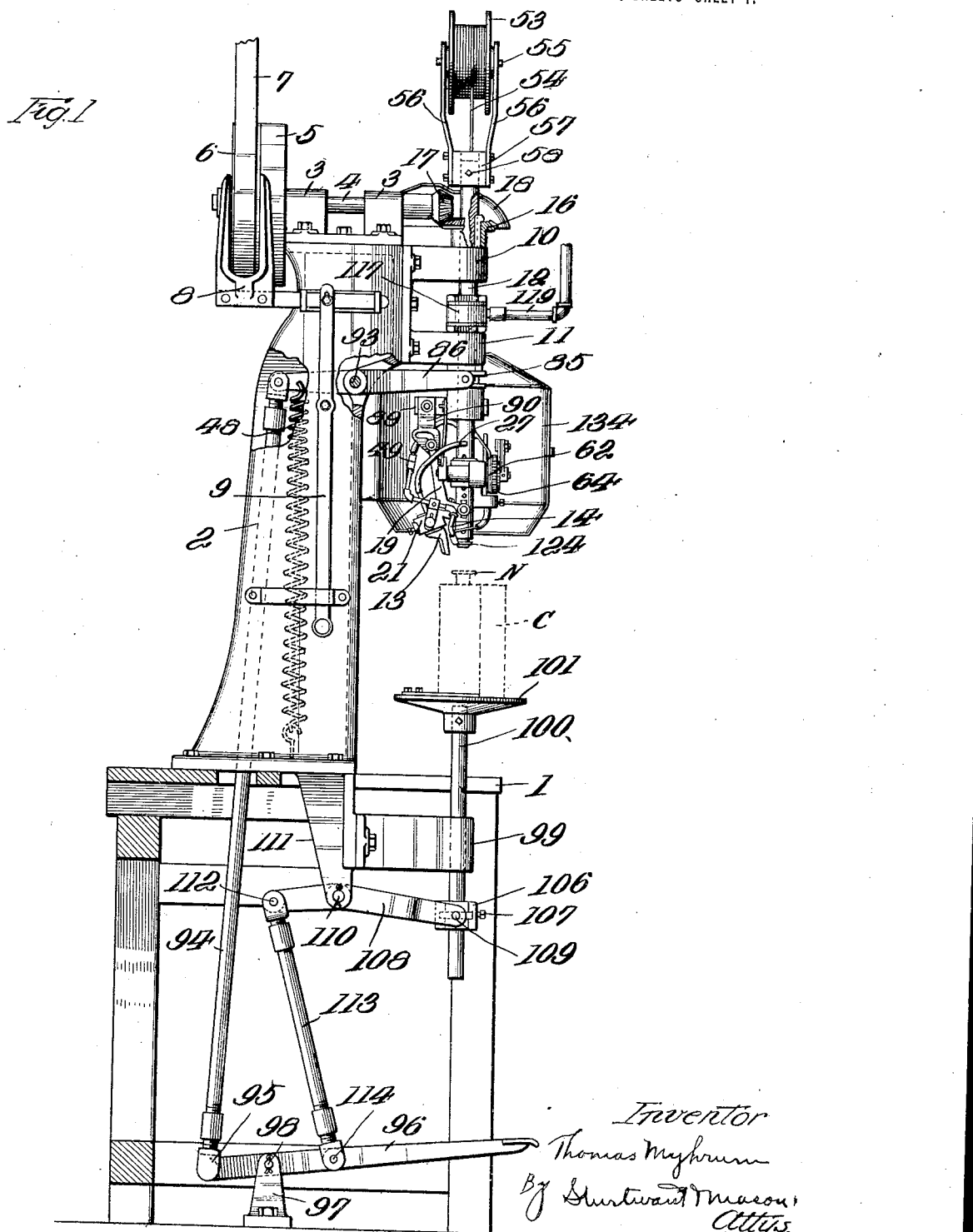

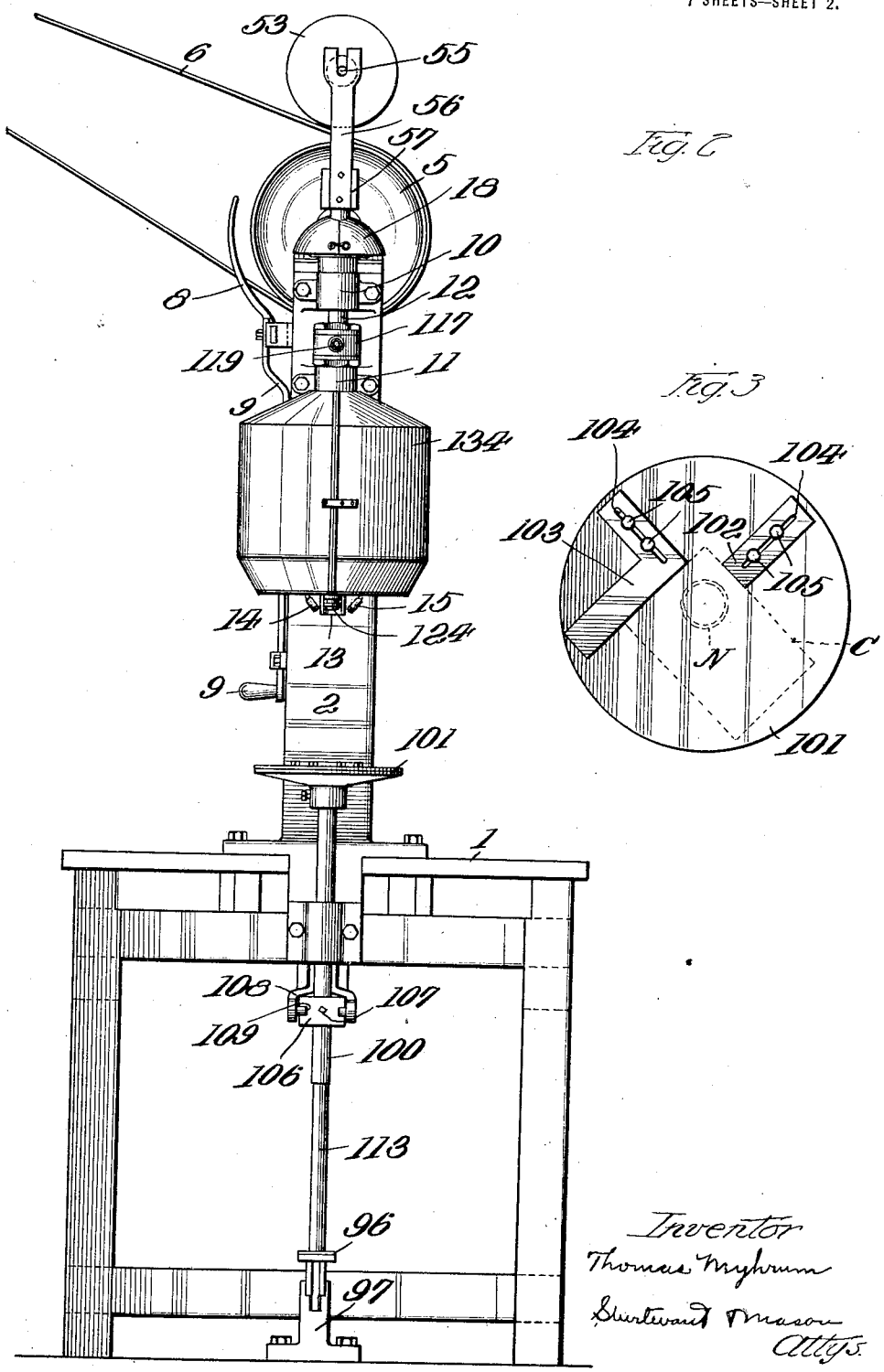

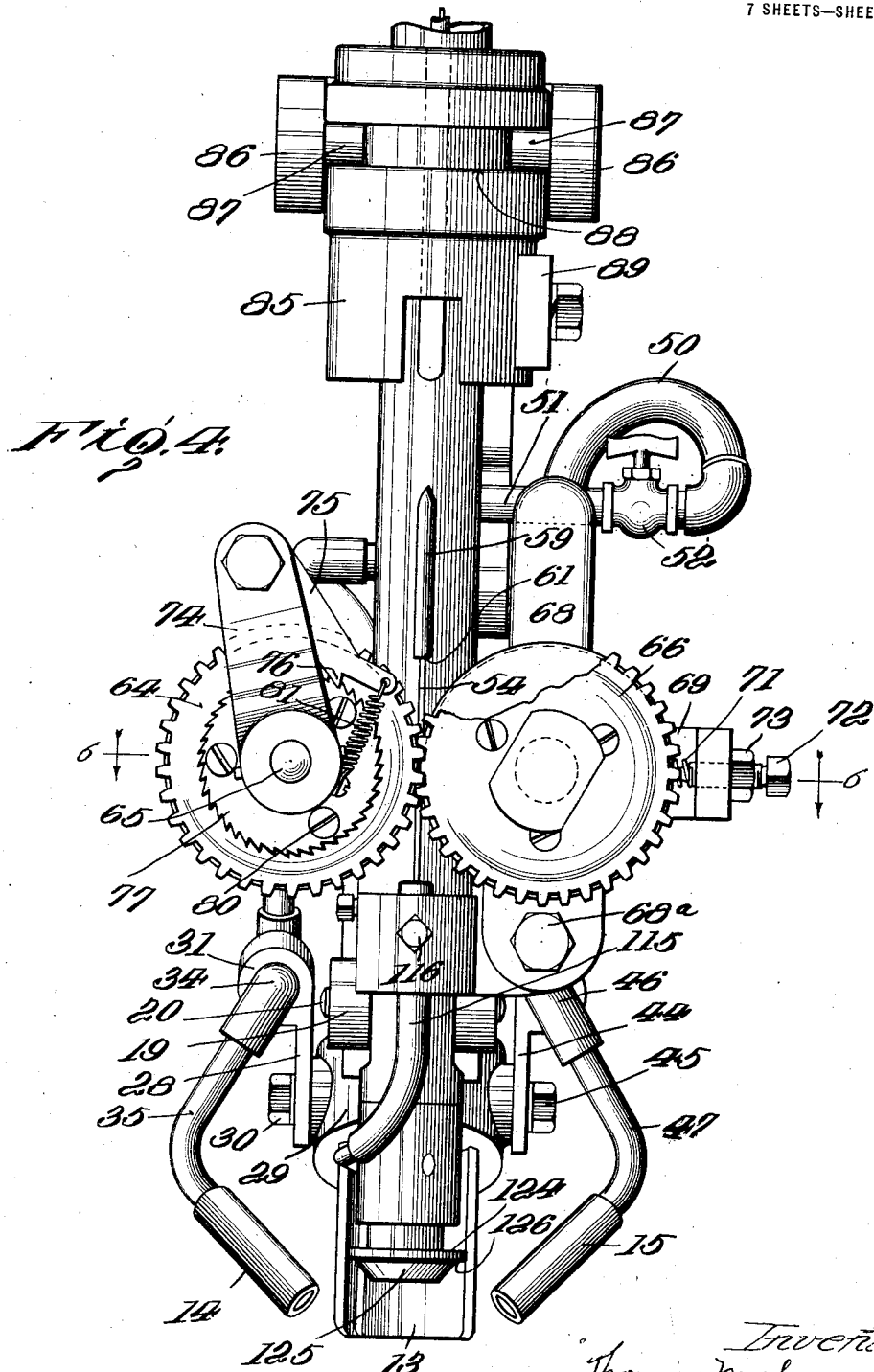

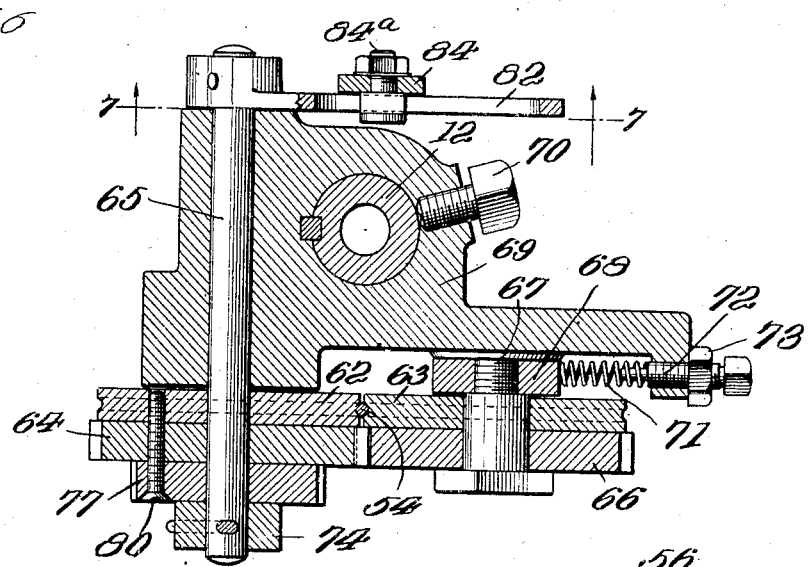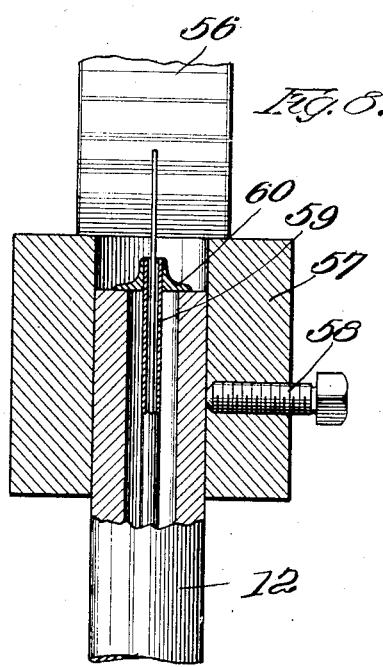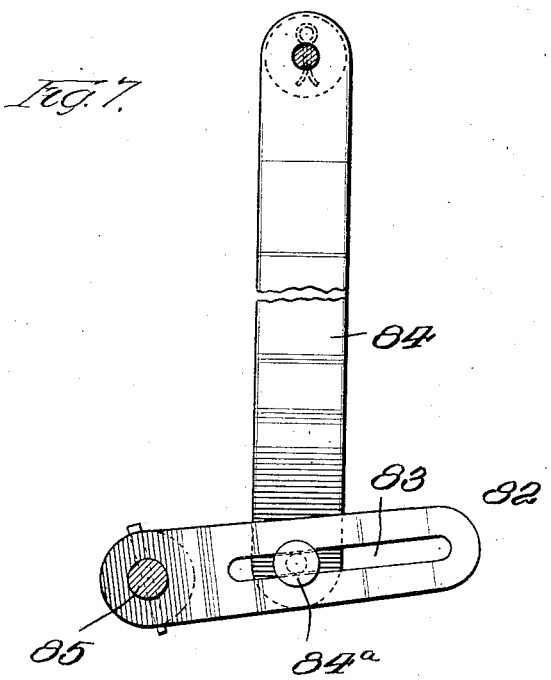

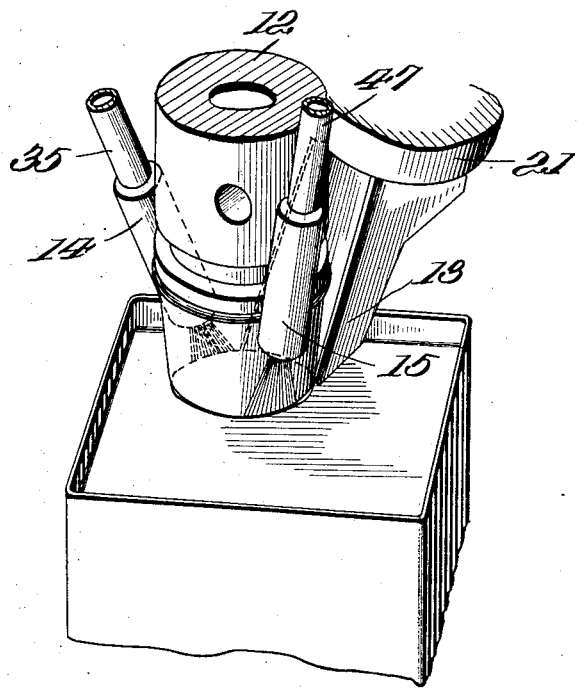
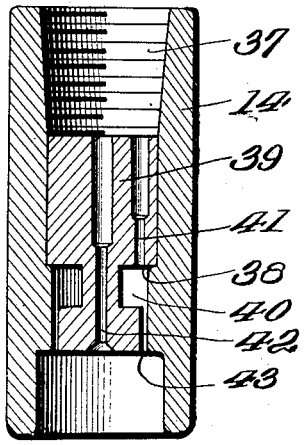

UNITED STATES PATENT OFFICE.

THOMAS MYHRUM, OF CHICAGO, ILLINOIS, ASSIGNOR TO CONTINENTAL CAN COMPANY, INC., OF SYRACUSE, NEW YORK, A CORPORATION OF NEW YORK.

SOLDERING-MACHINE.

1,389,894.   Specification of Letters Patent.   Patented Sept. 6, 1921.

Application filed March 1, 1920. Serial No. 362,614.

*To all whom it may concern:*

Be it known that I, THOMAS MYHRUM, a citizen of the United States, residing at Chicago, in the county of Cook, State of Illinois, have invented certain new and useful Improvements in Soldering-Machines, of which the following is a description, reference being had to the accompanying drawing and to the figures of reference marked thereon.

The invention relates to new and useful improvements in soldering machines, and more particularly to a machine wherein a soldering iron is mounted for rotation for applying solder to circularly disposed seams.

An object of the invention is to provide a machine of the above type wherein the soldering iron is mounted on a rotating head and located at one side of the axis of the head, and means is also mounted on said head for heating the iron and supplying solder thereto.

A further object of the invention is to provide a machine of the above type with a burner disposed in advance of the soldering iron for pre-heating the seam to which the solder is to be applied.

Another object of the invention is to provide a machine of the above type wherein the burner is disposed in rear of the soldering iron for sweating in the solder after it is applied to the seam by the iron.

Still another object of the invention is to provide a machine of the above type with a chuck for chucking a nozzle which is to be soldered to a can, and with mechanism for moving the soldering iron and burner toward and from the chuck to facilitate the placing of the nozzle on the chuck and the presenting of the iron to the nozzle so as to solder the seam joining the nozzle at its base to the can.

Still another object of the invention is to provide a machine of the above type wherein the can may be placed on a vertically movable support with mechanism by which the support may be raised to present the nozzle to the chuck, which mechanism contains devices for moving the iron and the burners away from the chuck and to facilitate the placing of the nozzle on the chuck and the subsequent placing of the iron relative to the nozzle for soldering.

These and other objects will in part be obvious and will in part be hereinafter more fully disclosed.

In the drawings which show by way of illustration one embodiment of the invention:—

Figure 1 is a view partly in side elevation and partly in section showing a machine embodying my improvements;

Fig. 2 is a front view of the machine;

Fig. 3 is a top plan view of the work support showing the gages for positioning the can which is to be soldered;

Fig. 4 is an enlarged front view of the rotating soldering head and the parts associated therewith;

Fig. 6 is a sectional view on the line 6—6 of Fig. 4;

Fig. 7 is a detail showing the operating means for the solder feed;

Fig. 8 is a view partly in section through the upper end of the rotating spindle, showing the bracket for supporting the solder reel;

Fig. 9 is a vertical sectional view through a part of the rotating head showing the connection of the gas supply pipe thereof;

Fig. 10 is a longitudinal sectional view through the soldering iron;

Fig. 11 is a sectional view on the line 11—11 of Fig. 10;

Fig. 12 is a sectional view through the lower end of the rotating head showing the yielding support for the chuck, and Fig. 13 is a view in perspective showing the lower part of the rotating head, the soldering iron and the burners, also a can nozzle chucked and being soldered by a machine.

Fig. 14 is an enlarged section through one of the burners.

Figure 5:
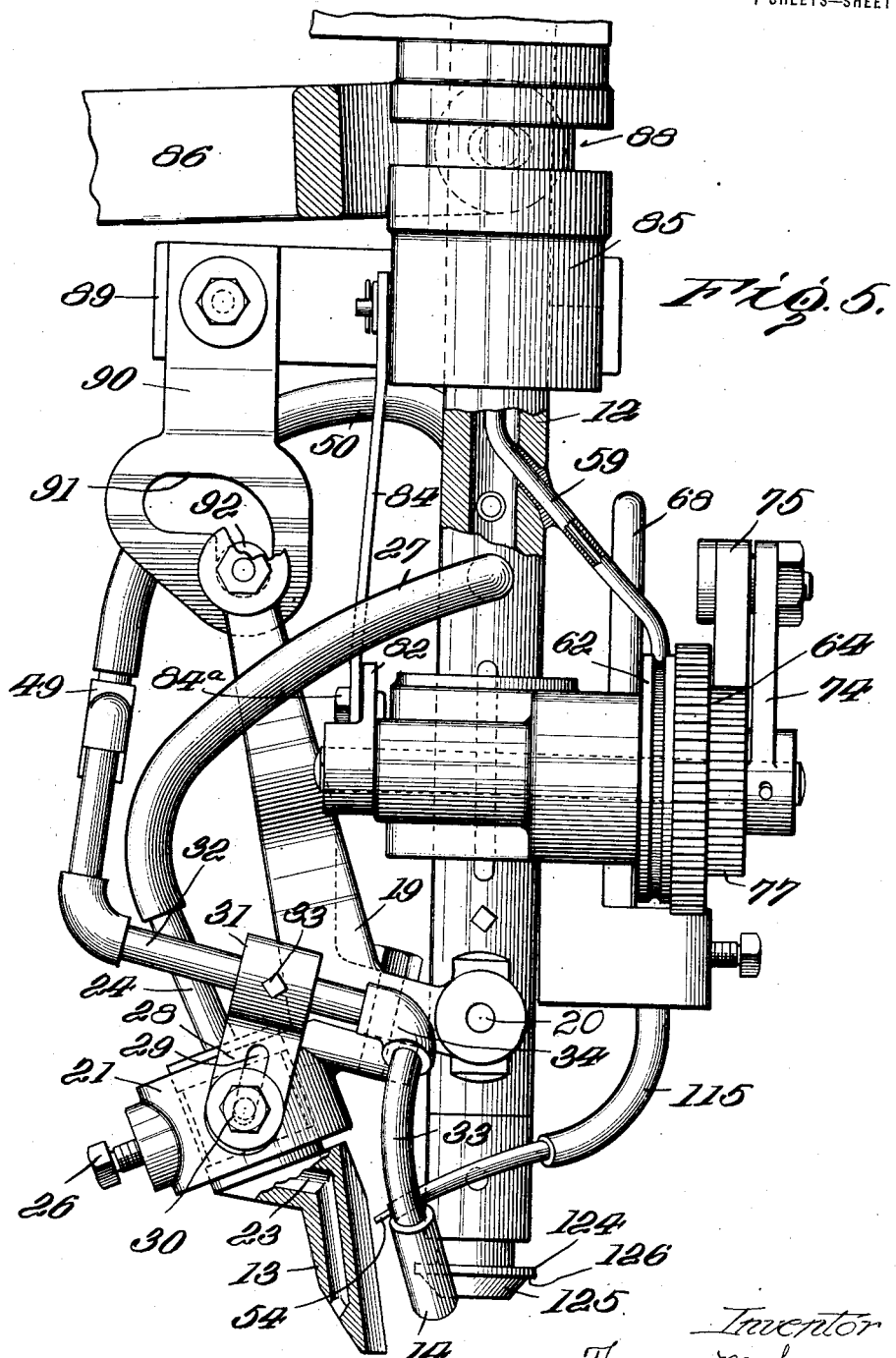
Fig. 5 is a side view of the rotating head and parts associated therewith, with certain of the parts in section.

The invention is directed broadly to a soldering machine for soldering circularly disposed seams, such, for example, as a seam for joining the base of a nozzle to a can body. The invention consists generally in a soldering iron, which is of segmental form and disposed at one side of the axis of the rotating head on which said iron is mounted. Disposed in advance of the iron is a burner for pre-heating the seam and in rear of the iron is a burner for sweating in the solder applied by the soldering iron. These burners, and the soldering iron are all mounted on the rotating head which rotates about a chuck adapted to engage the outer end of the nozzle and steady the nozzle and hold it in place or center the same relative to the traveling iron and burners. A solder supplying means is also mounted on said rotating head and automatically feeeds solder to the soldering iron. A gas burner is connected to said head and through suitable supply pipes the gas is distributed to an ignition chamber in the iron and to the burners in front and in rear of the iron. The iron and the burners are mounted so that they may be moved toward and from the chuck to facilitate the placing of the nozzle on the chuck and the presenting of the iron and burners to the seam at the base of the nozzle. This is of special advantage, particularly where the nozzle is a tapered nozzle, and is larger at the outer end than at its base. Means is also provided for supporting the can and raising the same so as to bring the nozzle into contact with the chuck and the raising means for the can controls the movements of the soldering iron and the burners toward and from the nozzle.

Referring more in detail to the drawings, the invention is shown as applied to a soldering machine carried by a supporting table 1. Said machine consists of a standard 2 which is preferably bolted to the table. Mounted to rotate in bearings 3, 3 carried at the upper end of the standard is a main shaft 4. Said shaft is rotated by a belt wheel 5 which is fixed to the shaft. An idle pulley 6 is mounted on the shaft and the belt 7 controlled by a belt shifter 8 is adapted to run either on the idle pulley 6 or the fixed pulley 5. This belt shifter 8 is controlled by a lever 9 which is readily accessible to the operator.

Mounted on the standard 2 are two spaced bearings 10 and 11 in which is mounted a rotating head 12. This rotating head 12 carries a soldering iron 13, a gas burner 14 and a gas burner 15. At the upper end of the rotating head 12 there is a bevel gear 16 which engages a bevel gear 17 carried by the main shaft 4. A suitable housing 18 is provided for inclosing the gears 16 and 17.

Mounted on the rotating head 12 is a swinging bracket 19. Said bracket is pivoted at 20 to said rotating head and partakes of the rotating movements of said head. The bracket 19 has a laterally extending sleeve 21 rigidly secured thereto, and this sleeve serves as a supporting means for the soldering iron 13. The soldering iron 13 as clearly shown in Figs. 4, 5 and 10, is segmental in shape and is disposed so that said soldering iron when in position for soldering, inclines outwardly toward its upper end away from the axis of rotation of the rotary head 12 (see Fig. 13). The shape of the soldering iron is such that the inner lip at the lower end conforms to the circular seam at the base of the nozzle of the can. In Figs. 12 and 13, a can is shown at C, to which a nozzle N is to be soldered. The can body is formed with an annular channel 22 into which the lower edge of the nozzle is placed, and it is desired to fill the space between the annular groove and the nozzle with solder.

The soldering iron is formed with an ignition chamber 23. A gas pipe 24 is threaded into the upper end of the soldering iron. This ignition chamber 23 extends to a point adjacent the lower end of the iron as indicated at 23ª. Part of the products of combustion escape through the passage 25 and the remainder through an opening at the end of chamber 23ª. The soldering iron is mounted in the sleeve 21 as above noted and is held in place therein by a set screw 26. The rotating head 12 is in the form of a sleeve which is closed at its upper and lower ends as will be hereinafter more fully described and gas is supplied to the inner chamber of the sleeve. There is a port extending laterally from the rotating head with which a flexible tube or pipe 27 is connected. This flexible pipe is also connected to the outer end of the pipe 24 leading to the soldering iron. Gas is supplied through the rotating head to the soldering iron and by means of a flexible pipe which permits the soldering iron to swing with its supporting bracket.

Mounted at one side of the supporting sleeve 21 of the soldering iron is a bracket arm 28. Said arm is formed with a longitudinal slot 29 through which a bolt 30 passes. Rigid with the arm 28 is a sleeve 31 through which a short length of pipe 32 extends, said pipe being clamped with the sleeve by a set screw 33. At the inner end of the pipe 32 there is a right angle pipe connection 34 which supports a short length of curved pipe 35, and at the lower end of the pipe 35 there is a burner 14. This burner 14 as shown in sectional view in Fig. 14 of the drawings, consists of an outer sleeve which is threaded at 37 to receive the pipe 35. Within said sleeve there is a shoulder 38. Before the burner 14 is attached to the pipe, the tip 39 is inserted. Said tip 39 engages the upper face of the shoulder 38 and rests thereon. This tip is formed with an annular chamber 40 and a passage 41 connects the interior of the pipe 35 with this annular chamber 40. Centrally through the tip is a passage 42. There is an annular passage 43 through which the gas passes and burns at the mouth in a circular flame while a pencil flame issues from the passage 42. The annular chamber 40 is a pressure reducing chamber and insures the continuous burning of the circular pilot flame.

On the opposite side of the supporting sleeve 21 from the bracket arm 28 is a second bracket arm 44. This bracket arm 44 has a slotted connection with a supporting bolt 45 and carries an elbow pipe 46. A short length of curved pipe 47 carried by the pipe 46 supports the burner 15 which is similar in construction to the burner 14. The pipe 32 and the pipe 46 are both connected to a cross head 49 and this cross head is connected to a flexible pipe 50 which in turn is connected to a short pipe 51 carried by the rotating head 12. Said pipe 51 is provided with a valve 52 and gas from the rotating head is conducted through this pipe 51 and the pipe 50 to the burners, the supply being controlled by the valve 52. The flexible pipe 50 permits the burners to be swung with the iron to which they are rigidly connected when the bracket 19 is swung to its pivotal support 20.

Solder is supplied to the soldering iron from a solder reel 53, said solder being in the form of a ribbon or rod as indicated at 54. The solder reel 53 is pivoted at 55 to bracket arms 56, 56 which in turn are supported by a collar 57, which collar fits the upper end of the rotating head 12 and is held thereon by means of a set screw 58. Extending downwardly through the central passage of the rotating head 12 is a pipe 59, and the solder rod 54 is led into this pipe. The pipe is supported at its upper end by a cap 60 which serves to close the upper end of the chamber in the rotating head 12. The pipe 59 extends out through an opening in the side wall of the rotating head 12 and this opening may be closed by brazing, soldering or otherwise. The pipe terminates at 61, a short distance above two solder feeding rolls 62 and 63. Each of these rolls is provided with a circumferential groove, and the solder rod lies in the groove and is gripped by the solder feeding rolls as clearly shown in Fig. 6 of the drawings. The solder feeding roll 62 is rigidly secured to a gear wheel 64 and this gear wheel is mounted to rotate freely on the shaft 65. The gear wheel 64 meshes with a gear wheel 66 to which the solder roll 63 is secured. The gear wheel 66 and solder feeding roll 63 are mounted to rotate freely on a stub shaft 67, and this stub shaft 67 is carried by a swinging support 68. This swinging support 68 and the shaft 65 are both carried by a bracket 69 which is keyed to the rotating head 12 and which is held from endwise movement thereon by a set screw 70. This permits the bracket to be adjusted longitudinally to the rotating head if desired. The support 68 is pivoted at 68ᵃ to the head and is moved by a spring 71 so as to cause the solder feeding roll 63 to frictionally grip the solder rod (see Fig. 6). The tension of the spring 71 may be adjusted by means of a screw 72 which is held in set positions by a lock nut 73.

Fixed to the end of the shaft 65 is an arm 74. This arm 74 carries a pivoted feeding pawl 75. Said pawl is provided with a tooth 76 which is adapted to engage a ratchet wheel 77 secured by screws 80 to the gear wheel 64, and to the solder feeding roll 62. These screws serve to join the gear wheel and the solder feeding roll. A spring 81 engaging the outer end of the feed pawl yieldingly holds the same in engagement with the ratchet. The shaft 65 is oscillated and at each oscillation, the feed pawl will step the ratchet 77 around, thus turning the solder feeding rolls and feeding the solder forward to the soldering iron.

The shaft 65 is oscillated by means of an arm 82, which arm is fixed to the end of the shaft, and this arm is slotted at 83 as indicated in Fig. 7. Fixed to the arm 82 is a link 84. Said link is secured to the arm by a bolt 84ᵃ passing through the slot and this connection between the link 84 and the arm 82 is therefore adjustable. The upper end of the link 84 is pivoted to a sliding sleeve 85. Said sleeve is keyed to the rotating head and rotates therewith, but is free to slide longitudinally on said head. The sleeve 85 is reciprocated by means of a lever 86 which has a forked end carrying projecting pins 87, 87, engaging within the annular groove 88 is said sleeve 85.

Projecting outwardly from the sleeve 85 is a bracket arm 89. Depending from the bracket arm 89 is a cam plate 90 which is fixed to the bracket arm. Said cam plate is formed with a slot 91. On the upper end of the bracket arm 19 there is a roller 92 which engages this cam slot 91. From the above it will be apparent that whenever the lever 86 is swung so as to move the sleeve 85 in a downward direction, the link 84 will move the outer end of the arm 82 downward and this will turn the solder feeding rolls so as to feed a small portion of the solder rod forward where it will be engaged by the soldering iron. This same movement of the sleeve 85 downwardly through the cam groove 91 will cause the upper end of the bracket arm 19 to swing outwardly and this will move the soldering iron and the burners carried by the bracket arm 19 in proper coöperative relation to the seam of the nozzle which is to be soldered. The lever 86 as clearly shown in Fig. 1 of the drawings, is pivoted at 93 to the standard 2 of the machine. At its left hand, as viewed in said figure, said lever is pivotally connected to a rod 94 which in turn is pivoted at 95 to a foot treadle 96. This foot treadle is mounted upon a bracket 97 and is pivoted at 98 thereto.

Mounted to slide in a bearing 99 is a standard 100 carrying a work supporting table 101 on which the can to be soldered is mounted. Said table, as clearly shown in Fig. 3 is provided with an adjustable gage 102 for engaging one side of the can indicated in dotted lines at C in said figure, and also an adjustable gage 103 engaging another side of said can. These gages are formed with slots 104, and clamping screws 105 associated with the gages serve as a means whereby said gages may be adjusted. The purpose of these gages is to position the can underneath the rotating head so that the axis of the rotating head will pass centrally through the nozzle which is to be soldered. The standard 100 is provided with a collar 106 near its lower end which is secured thereto by a set screw 107. This collar is connected with the forked end of a lever 108, said lever having pins 109 sliding in grooves in the collar. The lever 108 is pivoted at 110 to a bracket arm 111 carried by the table 1. This lever is also pivoted at 112 to a rod 113 which in turn is pivoted at 114 to the treadle 96.

The solder rod 54 after leaving the solder feeding rolls passes into a guiding tube 115 which is shaped so as to direct the solder to the front face of the soldering iron as clearly shown in Fig. 5 of the drawings. Said tube 115 is secured to the bracket 69 by a set screw 116.

Mounted on the rotating head 12 is a collar 117. Said collar has a central recess 118 extending entirely around the rotating head 12. A pipe 119 is threaded into said collar and connects with this recess 118. Said pipe 119 is connected with a suitable gas supply. The rotating head 12 is formed with a passage 120 which leads to the inner chamber formed therein. This passage 120 is always in connection with the recess 118 so that regardless of the position of the passage 120, gas is supplied to the central chamber in the rotating head 12. This collar 117 is secured to the rotating head by a gas-tight joint which as shown in the present embodiment of the invention consists of caps 121 threaded on to said collar at the upper and lower sides thereof, and said caps engage washers 122, respectively, formed with inclined faces adapted to engage a packing 123. This connection permits the head 12 to rotate freely.

At the lower end of the rotating head 12 there is a chuck 124. Said chuck is formed with a conical face 125 adapted to extend into the nozzle and with a shoulder 126 adapted to rest on the upper edge of the nozzle. The shock is mounted on the spindle 127. This spindle is journaled in an end bearing 128 which has a threaded connection with the rotating head 12. There is a recess 129 in the lower part of this bearing 128 and the chuck is formed with an upwardly extending sleeve 130 which fits within the recess 129. A spring 131 bears against the upper face of the chuck at its lower end and against a ball bearing 132 at its upper end. This spring normally forces the chuck downwardly, the spindle carrying a limiting collar 133 which determines the downward movement of the chuck. When the chuck is engaged by the nozzle, it may be yieldingly pressed upwardly into the rotating head. The chuck does not rotate with the head, but the head rotates around the chuck. The center of this chuck is in line with the axis of the rotating head.

When the parts are in the position shown in Fig. 5, the treadle is released and the outer end of the arm 86 is raised. The supporting table 101 for the can is also in its lowered position. The nozzle is placed in the can and the can placed on the supporting table after which the treadle is depressed. As the treadle moves downwardly, the can will be moved upwardly, bringing the nozzle into contact with the chuck. The gages on the table center the can so that the nozzle engages the chuck. After the chuck is engaged by the nozzle, said chuck may yield so as to firmly press the nozzle on its seat on the can body. When the lever 86 is raised, that is, before the treadle is depressed, the roller 92 lies in the vertical part of the slot 91 as viewed in Fig. 5, and is therefore at its extreme right hand position, and the bracket arm 19 is therefore swung to the right, and the soldering iron and burners associated therewith move to their extreme position away from the center of the rotating head and the chuck. During the first part of the upward movement of the supporting table, the roller 92 moving in the vertical part of the cam groove 91, effects no swinging movement of the bracket arm 19. After the upper end of the nozzle is well by the lower end of the soldering iron, the bracket arm 119 will be swung through the moving of the roller, to the left, in the cam groove 91 as viewed in Fig. 5. Thus it is that the soldering iron may be moved inwardly and brought into substantial contacting position with the seam at the base of the nozzle, notwithstanding the fact that the upper end of the nozzle is slightly larger in diameter than the lower end of the nozzle. It is to be remembered that the machine is in operation and the head is rotating continuously, and as the head rotates the soldering iron and the burners travel about the axis of the rotating head. As the soldering iron is moved inwardly, the solder feed rolls are turned so as to move the solder rod forward, and the solder rod coming in contact with the soldering iron will cause the proper amount of solder to be melted and to run down on to the iron and into the seam which is to join the nozzle to the body of the can. The burner 14 is in advance of the soldering iron and the flame thereof is directed against the nozzle right at the point which preheats the parts of the metal to which the solder is to be applied. The burner 15 following directly after the soldering iron, continues to apply heat to the seam so as to cause a sweating in of the solder and thus a perfect soldered joint to be made. When the treadle is released, the parts are returned to the position shown in Fig. 1, by a spring 48 that is, the soldering iron and burners are moved away from the nozzle and the work supporting table 101 dropped, causing the nozzle to move out of contact with the chuck. This outward movement of the soldering iron and the burners positions the feed pawl for another forward feed of the solder rod. This feed of the solder rod, however, does not take place until the soldering iron moves again into position for soldering the next nozzle. It will thus be seen that by the moving of the soldering iron to and from the nozzle, and controlling the feed of the solder by this same means which shifts the soldering iron, I am able to automatically control the supply of solder to the iron and only feed solder to the iron when the nozzle is present for soldering, notwithstanding the fact that the iron is continuously heating and is continuously rotating.

It will be noted that the solder feeding mechanism is all mounted upon the rotating head and the relation thereof to the soldering iron is preserved at all times in the rotation of the head. By adjusting the arms which carry the burners they may be shifted relative to the iron so as to properly position the same with respect to the iron and the seam which is to be soldered. By shifting the iron in its supporting bracket, it may also be properly set so that the curved segmental soldering lip thereof will properly conform to the circular disposed seam which is being soldered.

As a means for protecting the operator, I have provided the machine with a housing 134 which is secured to the lower bearing 11 and said housing completely covers the rotating head and the parts associated therewith, the housing being open at its lower end to permit the nozzle and upper end of the can to be brought into contact with the chuck and the solder.

It is obvious of course, that minor changes in the details of construction and the arrangement of the parts may be made without departing from the spirit of the invention as set forth in the appended claims.

Having thus described the invention, what it claimed as new, is:—

1. A soldering machine including in combination a rotating head, a soldering iron carried thereby and located at one side of the axis of the head, a chuck for centering the article to be soldered relative to the head, a support for the article to be soldered, means for yieldingly mounting the chuck so that it may move lengthwise of the axis of the head, and means for raising the support and the chuck to bring the seam into range of the soldering iron.

2. A soldering machine including in combination a rotating head, a soldering iron carried thereby and located at one side of the axis of the head, a chuck for centering the article to be soldered relative to the head, a pre-heating burner located in advance of the iron, and a sweating in burner located in rear of said iron.

3. A soldering machine including in combination a rotating head, a soldering iron, means for supporting said soldering iron on said head whereby said iron rotates with said head and at one side of the axis of the head, means for moving the iron from inoperative to effective soldering position, and a chuck carried by the head and centering the article to be soldered.

4. A soldering machine including in combination a rotating head, a soldering iron, means for supporting said soldering iron on said head whereby said iron rotates with said head and at one side of the axis of the head, means for moving the iron toward and from the axis of the head, a chuck carried by the head and centering the article to be soldered, a pre-heating burner located in advance of the soldering iron and a sweating in burner located in rear of the soldering iron, said burners being mounted to move toward and from the axis of the head on said soldering iron.

5. A soldering machine including in combination a rotating head, a soldering iron, means for supporting said soldering iron on said head whereby said iron rotates with said head and at one side of the axis of the head, means for moving the iron toward and from the axis of the head, a chuck carried by the head and centering the article to be soldered, a support for the article to be soldered, means for yieldingly supporting the chuck, means for raising the support, and moving the soldering iron into contact with the seam to be soldered.

6. A soldering machine including in combination a rotating head, a soldering iron, movable burners, means for supporting said soldering iron on said head whereby said iron rotates with said head and at one side of the axis of the head, means for moving the iron toward and from the axis of the head, a chuck carried by the head and centering the article to be soldered, a support for the article to be soldered, means for yieldingly supporting the chuck whereby said chuck may be moved longitudinally of the head, means for raising the support, and means operated thereby for moving the soldering iron into contact with the seam and for moving the burners toward the seam.

7. A soldering machine including in combination a supporting frame, a rotating head carried by said frame, a bracket mounted on said head and rotating therewith, a soldering iron carried by said bracket, said head having a chamber formed therein connected with a suitable gas supply, a flexible connection between the chamber in said head and the soldering iron, a chuck yieldably mounted at the lower end of said rotating head for chucking the article to be soldered, and means for moving said soldering iron toward and from said chuck.

8. A soldering machine including in combination a supporting frame, a rotating head carried by said frame, a bracket mounted on said head and rotating therewith, a soldering iron carried by said bracket, said head having a chamber formed therein connected with a suitable gas supply, a flexible connection between the chamber in said head and the soldering iron, a chuck yieldably mounted at the lower end of said rotating head for chucking the article to be soldered, means for moving said soldering iron toward and from said chuck, and a sweating in burner carried by said bracket and disposed in rear of said soldering iron.

9. A soldering machine including in combination a supporting frame, a rotating head carried by said frame, a bracket mounted on said head and rotating therewith, a soldering iron carried by said bracket, said head having a chamber formed therein connected with a suitable gas supply, a flexible connection between the chamber in said head and the soldering iron, a chuck yieldingly mounted at the lower end of said rotating head for chucking the article to be soldered, means for moving said soldering iron toward and from said chuck, and a pre-heating burner carried by said bracket and located in advance of said soldering iron.

10. A soldering machine including in combination a supporting frame, a rotating head carried by said frame, a bracket mounted on said head and rotating therewith, a soldering iron carried by said bracket, said head having a chamber formed therein connected with a suitable gas supply, a flexible connection between the chamber in said head and the soldering iron, a chuck yieldingly mounted at the lower end of said rotating head for chucking the article to be soldered, means for moving said soldering iron toward and from said chuck, a pre-heating burner adjustably carried by said bracket and located in advance of said iron, and a sweating in burner adjustably carried by said bracket and located in rear of said soldering iron.

11. A soldering machine including in combination a supporting frame, a rotating head carried by said frame, a bracket mounted on said head and rotating therewith, a soldering iron carried by said bracket, said head having a chamber formed therein connected with a suitable gas supply, a flexible connection between the chamber in said head and the soldering iron, a chuck yieldingly mounted at the lower end of said rotating head for chucking the article to be soldered, means for moving said soldering iron toward and from said chuck, and means carried by said rotating head for feeding solder to said iron.

12. A soldering machine including in combination a rotating head, a soldering iron carried thereby, means for moving said iron toward and from the axis of the head, means for heating the iron, and means for feeding solder to the iron, said solder feeding means being controlled by the means for moving the iron toward and from the head whereby as the iron is moved into operative position for soldering, a sufficient length of solder is moved forward by the solder feeding means to supply solder to the seam.

13. A soldering machine including in combination a rotating head, a sleeve movable longitudinally of said head, a bracket pivotally connected to the head, a soldering iron carried thereby, means for heating said soldering iron, a cam plate carried by said sleeve for engaging said bracket for centering the soldering iron, a solder feed for supplying solder to the iron, and means connected to said sleeve for operating the solder feed.

14. A soldering machine including in combination a rotating head, a sleeve movable longitudinally of said head, a bracket pivotally connected to the head, a soldering iron carried thereby, means for heating said soldering iron, a cam plate carried by said sleeve for engaging said bracket for centering the soldering iron, a solder feed for supplying solder to the iron, means connected to said sleeve for operating the solder feed, and a pre-heating burner and a sweating in burner carried by said bracket.

15. In a soldering machine, a rotating head, a chuck at the lower end of said head, said chuck being adapted to engage a can nozzle, a support for the can, a bracket pivoted to the rotating head, a soldering iron carried thereby, a shiftable sleeve carried by said rotating head, a cam plate carried by said shiftable sleeve for swinging said bracket whereby the soldering iron is held normally away from the chuck to permit the placing of the nozzle on the chuck and whereby said iron by the swinging of said sleeve may be brought into relation to the seam at the base of the nozzle.

16. In a soldering machine, a rotating head, a chuck at the lower end of said head, said chuck being adapted to engage the can nozzle, a support for the can, a bracket pivoted to the rotating head, a soldering iron carried thereby, a shiftable sleeve carried by said rotating head, a cam plate carried by said shiftable sleeve for swinging said bracket whereby the soldering iron is held normally away from the chuck to permit the placing of the nozzle on the chuck and whereby said iron by the swinging of said sleeve may be brought into relation to the seam at the base of the nozzle, and means carried by said rotating head for supplying said iron with solder.

17. In a soldering machine, a rotating head, a chuck at the lower end of said head, said chuck being adapted to engage the can nozzle, a support for the can, a bracket pivoted to the rotating head, a soldering iron carried thereby, a shiftable sleeve carried by said rotating head, a cam plate carried by said shiftable sleeve for swinging said bracket whereby the soldering iron is held normally away from the chuck to permit the placing of the nozzle on the chuck and whereby said iron by the swinging of said sleeve may be brought into relation to the seam at the base of the nozzle, a pre-heating burner located in advance of said iron and a sweating in burner located in rear of the iron, and means for supplying said burners with gas.

18. In a soldering machine, a rotating head, a pivoted bracket carried thereby, a shiftable sleeve mounted on said head, a cam plate for shifting said pivoted bracket, a soldering iron carried by said pivoted bracket, solder feeding rolls carried by said head, said head having a chamber disposed centrally thereof, means for supplying gas to said head, a flexible connection between said chamber and said iron, and means operated by said sleeve for rotating the solder feeding rolls.

19. In a soldering machine, a rotating head, a pivoted bracket carried thereby, a shiftable sleeve mounted on said head, a cam plate for shifting said pivoted bracket, a soldering iron carried by said pivoted bracket, solder feeding rolls carried by said head, said head having a chamber disposed centrally thereof, means for supplying gas to said head, a flexible connection between said chamber and said iron, means operated by said sleeve for rotating the solder feeding rolls, a yielding chuck carried by said rotating head, a support, means for raising said support for causing the article carried thereby to engage the chuck, and devices operated by said support raising means for shifting the sleeve to bring the soldering iron into operative relation to the seam to be soldered.

20. A soldering machine including in combination a supporting frame, a vertically disposed rotatable head carried by said frame, means for rotating said head, a solder reel mounted at the upper end of said head, a pivoted bracket carried by said head, a soldering iron carried thereby, a pre-heating burner carried by said bracket located in advance of said iron, a sweating-in burner carried by said bracket in rear of said iron, said rotating head having a chamber formed therein, means for supplying gas to said chamber, flexible connections between said chamber and said burners and said iron, a shiftable sleeve carried by said head, solder feeding rolls carried by said head, means for directing the solder from the solder supplying reel centrally through said shiftable sleeve and thence outwardly to said solder feeding rolls, means whereby said shiftable sleeve swings said bracket and operates said solder feeding rolls, a yielding chuck carried at the lower end of said rotating head, a support beneath said chuck, a foot treadle and devices operated thereby for raising said support into engagement with said chuck, devices operated by said foot treadle for shifting said sleeve whereby the article to be soldered may be brought into engagement with said chuck, and upon further upward movements of the article after it has been chucked, the soldering iron swung into operative engagement with the seam to be soldered.

21. A soldering machine including in combination a rotating head, a soldering iron mounted on said rotating head and movable toward and from the axis thereof, a solder feed mounted upon said rotatable head and operated by the means for moving said iron toward and from the axis of the head.

22. A soldering machine including in combination a rotating head, a soldering iron carried thereby, a solder feed mounted upon said head, and a casing inclosing said iron and solder feed, said casing being open at the bottom.

In testimony whereof, I affix my signature.

THOMAS MYHRUM.